United States Patent
Hog

(10) Patent No.: US 6,329,923 B2
(45) Date of Patent: *Dec. 11, 2001

(54) PROCESS AND DEVICE FOR OPERATING A RAIN SENSOR

(75) Inventor: Norbert Hog, Buehl (DE)

(73) Assignee: Robert Bosch GmbH GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/380,924
(22) PCT Filed: Jun. 20, 1998
(86) PCT No.: PCT/DE99/01701
    § 371 Date: Sep. 9, 1999
    § 102(e) Date: Sep. 9, 1999
(87) PCT Pub. No.: WO99/02379
    PCT Pub. Date: Jan. 21, 1999

(30) Foreign Application Priority Data

Jul. 8, 1997 (DE) .............................. 197 29 103

(51) Int. Cl.$^7$ ...................................... G01W 1/00
(52) U.S. Cl. .................. 340/601; 340/602; 318/450; 318/483; 15/250.001; 15/250.12
(58) Field of Search ..................... 340/601, 602; 318/480, 483; 15/250.001, 250.12

(56) References Cited

U.S. PATENT DOCUMENTS

| | | | |
|---|---|---|---|
| 4,916,374 | * | 4/1990 | Schierbeek et al. ............... 318/483 |
| 5,059,877 | * | 10/1991 | Teder ................................ 318/444 |
| 6,040,669 | * | 3/2000 | Hog .................................. 318/480 |

\* cited by examiner

Primary Examiner—Julie Lieu
(74) Attorney, Agent, or Firm—Michael J. Striker

(57) ABSTRACT

An apparatus and a method for operating a rain sensor (10) that outputs a sensor signal (18, 22) as a function of the wetting of a window (11) are proposed, having a controller (16) which as a function of the sensor signal (18, 22) outputs a control signal (28) to the rain sensor (10) for regulating the sensor signal (18, 22); for signal evaluation, the sensor signal (18, 22) and in addition the control signal (28) are used for tripping switching events of a device.

10 Claims, 1 Drawing Sheet

US 6,329,923 B2

PROCESS AND DEVICE FOR OPERATING A RAIN SENSOR

BACKGROUND OF THE INVENTION

The invention is based on an apparatus and a method for operating a rain sensor.

From German published, nonexamined Patent Application DE-OS 41 12 847, an apparatus for operating a rain sensor is already known having a transmitter which is triggered by a preceding control arrangement, a receiver which outputs a sensor signal to a signal processor, and an evaluator, which outputs a switching signal for turning a windshield wiper on as a function of the sensor signal.

A regulator is also provided that regulates the sensor signal, which corresponds to a clean window, to a predetermined resting level. To that end, the controller outputs a control signal to the control arrangement of the transmitter for the sake of slowly regulating the transmission power to a predetermined resting level. Alternatively, the controller outputs a control signal to the signal processor for slowly regulating the gain of the sensor signal to be amplified. With the regulator, production variations among individual components of the rain sensor as well as tolerances in rain sensor installation can be compensated for over a wide range.

A disadvantage is that the controller regulates the sensor signal corresponding to a clean, dry window to the resting level, preferably at the outset, and that over the further course of sensor operation the control signal of the controller is allowed to vary in comparison with the sensor signal only extremely slowly, so that changes in the sensor signal will not be cancelled out. That is, the regulator essentially performs a (one-time) calibration of the rain sensor.

This then means that the evaluation of the sensor signal takes place essentially in the working range that has been set. This has the disadvantage that at small sensor signals, any change in the sensor signal has poorer resolution than an equally major relative change in large sensor signals.

In accordance with the present invention, the control signal outputted by a controller as a function of the sensor signal is also delivered to an evaluation arrangement for treating switching events of the device.

SUMMARY OF THE INVENTION

The apparatus according to the invention has the advantage that a controller regulates a rain sensor as a function of the degree of wetting of a window, and that the sensor signal and in addition the control signal of the controller are delivered to an evaluation arrangement for evaluation. In this way, the control signal and the working range can be tracked directly and quickly as a function of the sensor signal, without the sensor signal being cancelled out. The working range of the sensor signal can therefore be selected to be smaller, so that for a suitable gain the resolution becomes greater.

With the provisions recited in the dependent claims, advantageous refinements of and improvements to the characteristics recited in the main claim are obtained. One particular advantage is the spatial separation of the evaluation arrangement from the control circuit for the rain sensor, which is made possible by the fact that the regulation is performed by an electronic regulator, so that a microcontroller is used only for the evaluation.

As a further advantage, the evaluation arrangement or microcontroller is there for part of a central electronic system of a motor vehicle.

It is also advantageous that the microcontroller requires only low power and a low clock speed, because as a "listener", it merely evaluates signals.

Another advantage is that the controller regulates the working range of the transmitter continuously or in stages and is embodied in a space-saving way as an ASIC (application-specific IC).

The separate transmission of the sensor signal and the control signal to the microcontroller is especially advantageous. As a result, a wide dynamic scope of the microcontroller input and high resolution are obtained. A further advantage is the use of a differential amplifier to evaluate the sensor signal. This sets a differential working range, so that slight signal changes can be evaluated with high resolution in the evaluation arrangement.

BRIEF DESCRIPTION OF THE DRAWINGS

Exemplary embodiments of the invention are shown in the drawing and described in further detail in the ensuing description.

DESCRIPTION OF THE EXEMPLARY EMBODIMENT

Figure 1:
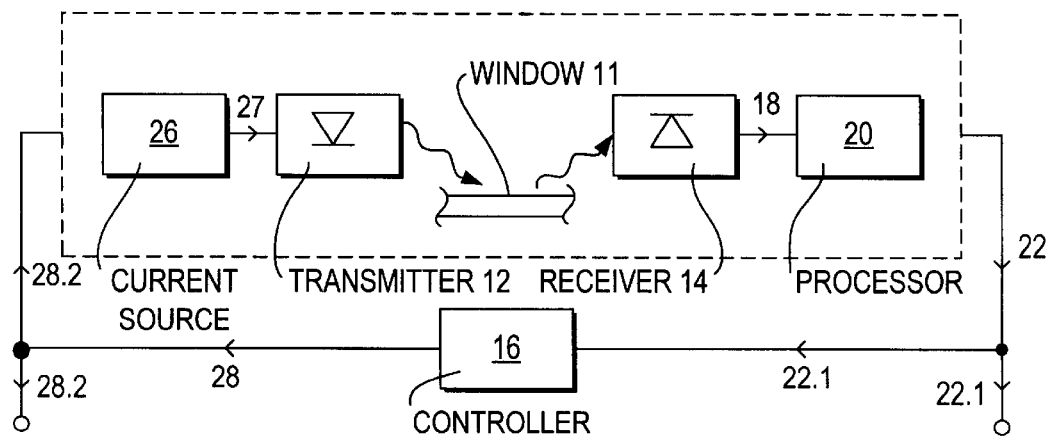
FIG. 1 shows a schematic circuit diagram of a control circuit of a rain sensor.

FIG. 1 shows a rain sensor 10, which has at least one transmitter 12 and one receiver 14 and is operated in a control circuit with a controller 16. The rain sensor detects the wetting of a motor vehicle window 11, for instance, by moisture and is disposed in the wiping area of a windshield wiper (not shown).

The rain sensor 10 functions on an optoelectronic principle. However, some other sensor principle is equally suitable. For instance, acoustic, capacitive and resistive rain sensors are known. The acoustic rain sensor converts sound waves into a corresponding electrical output signal; the resistive rain sensor varies its conductance, and the capacitive rain sensor varies its capacitance upon the occurrence of moisture or dirt on the window.

The optoelectronic rain sensor 10 used here includes a light-emitting transmitter 12, whose light is coupled into the window 11, passed through the window 11, and out-coupled at a certain point of the window 11 to a light-detecting receiver 14. The receiver 14 converts the detected light quantity into a sensor signal 18, which is delivered to a signal processor 20. The signal processor 20 is embodied as an operational amplifier. The use of other current-voltage converters is also possible, however. The signal processor 20 is located in the rain sensor 10, but may also be disposed outside the rain sensor 10.

The processed sensor signal 22 (22.1) is delivered on the one hand to the analog controller 16 of the control circuit, which regulates the transmitter current 27 of the transmitter 12 as a function of the sensor signal 22. To that end, the controller 16 outputs a control signal 28 (28.1), with which a capacitor is charged, whose capacitor voltage acts as a control voltage for a voltage-controlled current source 26. A comparator is integrated with the controller 16 and compares the level of the sensor signal 22 with limit values of a predetermined working range. As a function of the outcome of the comparison, the control signal 28 is increased, decreased, or kept constant. The controller 16 of the control circuit is also disposed in a space-saving manner as an ASIC in a housing of the rain sensor 10, which housing is mounted on the window 11 of the motor vehicle.

Figure 2:
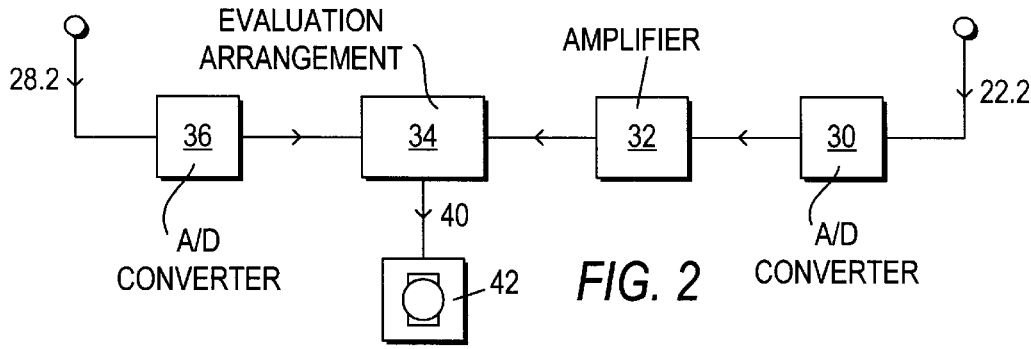
FIG. 2 shows a circuit for evaluating control signals and sensor signals.

The sensor signal 22 (22.2) is delivered on the other hand to a circuit according to FIG. 2 for evaluation; this circuit includes, among other elements, a differential amplifier 30, an analog/digital converter 32, and an evaluation arrangement 34.

According to the invention, the control signal 28 (28.2) of the controller 16 is also delivered to the evaluation arrangement 34, via a second A/D converter 36.

If a microcontroller is used for evaluating the signals 22, 28, then the A/D converters 32, 36 are typically integrated with the microcontroller. In the case of analog evaluation, the A/D converters 32, 26 can be dispensed with.

Via an output signal 40 of the evaluation arrangement 34, a downstream apparatus, such as a wiper motor 42 of a motor vehicle windshield wiper system, is triggered automatically as a function of the wetting of the window.

The evaluation circuit of FIG. 2 is part of a central electronic system of the motor vehicle, but it can also be disposed on the wiper motor 42 or in the rain sensor housing.

The mode of operation of the apparatus of the invention as shown in FIGS. 1 and 2 will now be described in further detail.

First, the control circuit should be explained. The receiver 14 outputs a sensor signal 18 to the signal processor 20, and this signal is amplified there in such a way that the maximum value for the sensor signal 22 is at 5 volts, for instance. The amplification is effected linearly. In the controller 16, the range between 4 and 5 volts is specified as the working range for the sensor signal 22. The signal 22 delivered to the controller 16 is compared by the comparator with the two limit values of the working range.

If the sensor signal 22 is between the two limit values, then the control signal 28, by way of which the transmitter power is triggered, remains unchanged. As already described at the outset, the input voltage of the voltage-controlled current source 26 is defined by the control signal 28. Thus the current 27 generated by the current source 26, and hence also the transmitter power of the transmitter 12, are specified as a function of the control signal 28.

If the sensor signal 22 is below the lower limit value, then the controller 16 outputs a rising control signal 28, and thus also an increase in current 27, until the sensor signal 18, 22 output by the receiver 14 is again within the working range of the comparator.

In the opposite case, if the sensor signal 22 exceeds the upper limit value, the controller 26 reduces the control signal 28 and thus also the current 27 and the transmission power. The control signal 28 is reduced until such time as the sensor signal 22 is again within the working range.

Independently of the mode of operation of the control circuit of FIG. 1, sensor signals 22 (22.2) and control signals 28 (28.2) are also delivered to the evaluation arrangement 34. The linearly amplified sensor signal 22 is delivered to the differential amplifier 30, which extends the working range. The maximum sensor signal 22 is applied to the maximum input of the microcontroller. For an 8-bit microcontroller and a maximum sensor signal of approximately 5 volts, one bit corresponds to approximately 20 millivolts. Because on account of the defined working range of the controller 16 only high levels of the sensor signal 22 are evaluated, very good resolution is obtained.

The evaluation of the sensor signals 22 and control signals 28 in the evaluation arrangement 34 or microcontroller is now done as follows:

As long as the control signal 28 remains constant, the evaluation arrangement 34 evaluates only the sensor signal 22 for the wetting of a window by rain, moisture, ice or dirt and by means of output signals 40 triggers a windshield wiper system with a wiper motor 42. Thresholds are stored in memory for this purpose in the evaluation arrangement 34. When a first threshold is reached by the sensor signal 22, one wiper mode (intermittent or constant operation) is typically tripped.

If the sensor signal 22 moves out of the working range, this requires correction of the transmitter power of the transmitter 12 by increasing or decreasing the control signal 28, which is done by the controller 16. The evaluation arrangement 34 detects the change in the control signal 28 and then evaluates only the control signal 28 with a view to triggering the wiper motor 42. The sensor signals 22 are not taken into account then. Once the control signal 28 reaches a further threshold, stored in the evaluation arrangement 34, a wiper mode is tripped.

As soon as the sensor signal 22 is again within the working range, the control signal 28 remains constant. This is detected by the evaluation arrangement 34, and after that only the sensor signal 22, instead of the control signal 28, is taken into account for the evaluation.

Figure 3:
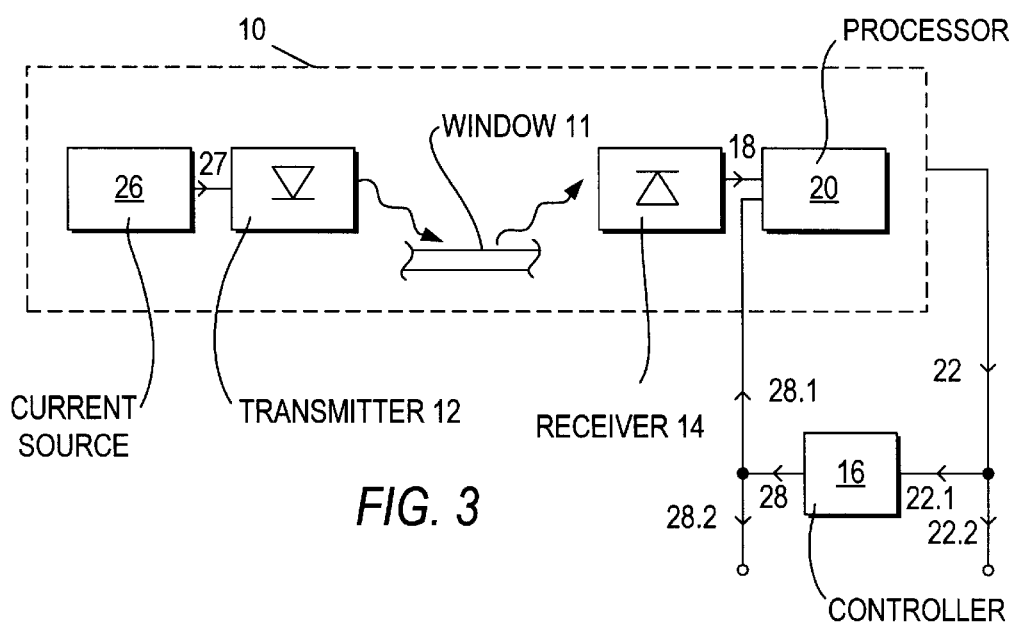
FIG. 3 shows an alternative preferred embodiment of a circuit diagram of a control circuit.

FIG. 3 shows an alternative exemplary embodiment of the control circuit, in which the controller 16 acts on the signal processor 20 of the sensor signal 18. By varying the gain for the sensor signal 18 in the signal processor 20, the amplified sensor signal 22 is regulated into the working range. The transmission power of the transmitter 12 is thus set to be constant, and near a maximum value, by the current source 26. The evaluation of the sensor signal 22 (22.2) and the control signal 28 (28.2) is done analogously to the evaluation described above.

In a modification of the exemplary embodiments of FIGS. 1 through 3, a digital controller 16 is used, which outputs control signals 28 to the voltage-controlled current source 26 as a function of digital sensor signals 22. The regulation takes place here via a resistor circuit in the controller 16, so that discrete control signals 28 allow regulation of the transmitter power of the transmitter 12 in stages. The A/D converters 32/36 in the evaluation arrangement of FIG. 2 are omitted.

What is claimed is:

1. An apparatus for operating a rain sensor (10) which is used for automatic triggering of a device, in particular a windshield wiper for motor vehicles, having a transmitter (12), a receiver (14) whose sensor signal (18) as a function of detected moisture is delivered to a signal processor (20) and to an evaluation arrangement (34) downstream thereof, and a controller (16), which has a function of the sensor signal (18, 22) outputs a control signal (28) to the rain sensor (10), wherein in addition to outputting the control signal to the rain sensor (18, 22), the control signal (28) is also separately delivered to the evaluation arrangement (34) for tripping switching events of the device, and the controller (16) regulates a transmission power of the rain sensor (10).

2. The apparatus of claim 1, wherein the evaluation arrangement (34) is disposed spatially remotely from the rain sensor (10) and/or the controller (16), and preferably forms part of a central electronic system of a motor vehicle.

3. The apparatus of claim 1, wherein the controller (16) regulates the transmission power of the transmitter (12)

continuously or in stages, in particular upon attainment of limit values for the working range of the rain sensor.

4. The apparatus of claim 1, wherein the controller (16) is constructed as an ASIC (application-specific IC).

5. The apparatus of claim 1, wherein it has a differential amplifier 30 for amplifying the sensor signal 22.

6. The apparatus of claim 1, wherein the control signals 28 or sensor signals 18, 22 delivered to the evaluation arrangement 34 are analog or digital.

7. The apparatus of claim 1, wherein it is intended for use for triggering a wiper motor (42) of a windshield wiper system.

8. A method for operating a rain sensor (10) which is used for automatic triggering of a device, in particular a windshield wiper for motor vehicles, having a transmitter (12), a receiver (14) whose sensor signal (18) as a function of detected moisture is delivered to a signal processor (20) and to an evaluation arrangement (34) downstream thereof, and a controller (16), which is a function of the sensor signal (18, 22) outputs a control signal (28) to the rain sensor (10), wherein in addition to outputting the control signal to the rain sensor (18, 22), the control signal (28) is also separately delivered to the evaluation arrangement (34) for tripping switching events of the device, and the controller (16) regulates a transmission power of the rain sensor (10).

9. The method of claim 8, wherein the evaluation arrangement (34) evaluates the control signal (28) and/or the sensor signal (18, 22).

10. A method for operating a rain sensor (10) which is used for automatic triggering of a device, in particular a windshield wiper for motor vehicles, having a transmitter (12), a receiver (14) whose sensor signal (18) is delivered to a signal processor (20) and to an evaluation arrangement (34) downstream thereof, and a controller (16), which is a function of the sensor signal (18, 22) outputs a control signal (28) to the rain sensor (10), wherein in addition to the sensor signal (18, 22), the control signal (28) is also delivered to the evaluation arrangement (34) for tripping switching events of the device, the evaluation arrangement (34) evaluates the sensor signal (18, 22) if the control signal (28) is constant, and if the control signal (28) is varying, it evaluates the control signal (28) independently of the sensor signal (18, 22) for tripping switching events of the device.

* * * * *